(12) United States Patent
Chou (10) Patent No.: US 6,761,572 B1
(45) Date of Patent: Jul. 13, 2004

(54) MINI MEMORY CARD CONNECTOR (76) Inventor: Pen-Yuan Chou, 2F, No. 142-1, Fu-Er Street, Chitu Dist., Keelung (TW)

(*) Notice: Subject to any disclaimer, the term of this patent is extended or adjusted under 35 U.S.C. 154(b) by 0 days.

(21) Appl. No.: 10/383,145

(22) Filed: Mar. 6, 2003

(30) Foreign Application Priority Data

Dec. 31, 2002 (TW) .................................... 91221636 U (51) Int. Cl.⁷ .............................................. H01R 29/00
(52) U.S. Cl. ........................ 439/188; 439/636; 439/331
(58) Field of Search ................................ 439/637, 326, 439/188, 331, 630, 636

(56) References Cited

U.S. PATENT DOCUMENTS 5,139,435 A * 8/1992 Komatsu et al. ............. 439/159
6,062,889 A * 5/2000 Hyland et al. ............... 439/326
6,129,588 A * 10/2000 Chang ......................... 439/630
6,149,466 A * 11/2000 Bricaud et al. .............. 439/326
6,319,036 B1 * 11/2001 Zheng et al. ................ 439/326
6,623,304 B2 * 9/2003 Harasawa et al. ........... 439/326

* cited by examiner

Primary Examiner—P. Austin Bradley
Assistant Examiner—Briggitte R. Hammond
(74) Attorney, Agent, or Firm—Law Offices of John Chupa and Associates, P.C.

(57) ABSTRACT

A mini memory card connector is constructed to include an insulating housing defining an insertion slot for receiving one of a set of mini memory cards, front terminal grooves, middle terminal grooves, and rear terminal slots, a set of first terminals respectively mounted in the front terminal grooves for the contact of a first mini memory card, a set of second terminals respectively mounted in the middle terminal grooves for the contact of a second mini memory card, and a set of third terminals respectively mounted in the rear terminal slots for the contact of a third mini memory card.

17 Claims, 8 Drawing Sheets

MINI MEMORY CARD CONNECTOR

BACKGROUND OF THE INVENTION

1. Field of the invention

The present invention relates to a memory card connector and, more particularly, to a mini memory card connector, which has a slot in the open side of the housing for receiving any of a variety of mini memory cards such as XD card, MS card, SD card, or MMC card.

2. Description of the Related Art

Flash memory brings convenience to information industries for storage of data. For single, independent, or temporary data storage, flash memory eliminates the necessity of installing a big capacity of main memory. By means of the use of a single piece of flash memory, the storage and file management of particular data become easy.

Memory cards for use in consumer electronic products such as digital cameras, digital video cameras, MP3 players, PDAs, etc., include MMC cards (Multi-Media Cards), SD cards (Secure Digital Cards), SM cards (Smart Media Cards), CF cards (Compact Flash cards Type I and Type), and XD cards developed by Olympus and Fuji. The difference between a SD card and a MMC card is the number of pins. These two cards use a same slot in a read write apparatus. The storage capacity of an XD card can be expanded to several BGB, meeting user's requirement for image processing. However, it is regrettable that conventional read write apparatus cannot read an XD card.

Commercially available read write apparatus commonly have only one slot for the loading of a particular model of memory card, or one of a few models of memory cards. For reading a different model of memory card, the user may have to change the read write apparatus. In order to eliminate this problem, read write apparatus capable of reading different memory cards are developed. However, these multipurpose read write apparatus have at least two slots in the front open side for receiving different memory cards. These dual-slot read write apparatus are commonly bulky. Further, these dual-slot read write apparatus commonly have a complicated structure.

SUMMARY OF THE INVENTION

The present invention has been accomplished under the circumstances in view. According to one aspect of the present invention, the mini memory card connector has an insertion slot and three sets of terminals respectively suspended in the insertion slot at different locations for the connection of one of a set of mini memory cards including XD card, SD/MMC card, and MS card.

According to another aspect of the present invention, a metal shield is provided for fastening to the housing to prevent a magnetic leakage and for contacting grounding mounting plates at the bottom side of the housing.

According to still another aspect of the present invention, the terminals each have a respective solder end extended out of the bottom side of the housing for soldering to a printed circuit board through surface mounting technique.

According to still another aspect of the present invention, a deck is provided for fastening to the housing, having a set of terminals for the contact of a CD or SM card.

DETAILED DESCRIPTION OF THE PREFERRED EMBODIMENT

Referring to FIGS. 1–4, a mini memory card connector is shown comprised of a housing 1, a first terminal set 2, a second terminal set 3, and a set of third terminals 4.

The housing 1 is made of electrically insulating material, having an insertion slot 12 horizontally inwardly extended from the front side 11. The insertion slot 12 is a stepped slot made subject to the sizes and shapes of different mini memory cards such as XD card, SD card, MMC card, and MS card, having positioning means (pegs, ribs, and/or notches) for positive positioning of a mini memory card. The insertion slot 12 has a bottom wall 13 and two lateral sidewalls 14. The bottom wall 13 has front terminal grooves 131 and middle terminal grooves 132, which receive the terminals 21 of the first terminal set 2 and the terminals 31 of the second terminal set 3 respectively, keeping the respective contact ends 22 of the terminals 21 of the first terminal set 2 respectively and axially aimed at the respective contact ends 32 of the terminals 31 of the second terminal set 3 and the respective solder ends 23 and 33 of the terminals 21 and 31 of the first terminal set 2 and the second terminal set 3 respectively downwardly extended out of the bottom wall 13. A vertical back wall 15 is transversely connected between the two lateral sidewalls 14, having a plurality of terminal slots 151, which receive the terminals 41 of the third terminal set 4 respectively, enabling the front contact ends 42 of the terminals 41 to be suspended in the opening 133 between the bottom wall 13 and the vertical back wall 15 and the rear solder ends 43 of the terminals 4 to be extended downwards to the outside of the housing 1. Because the solder ends 23, 33 and 43 of the terminals 21, 31 and 41 are suspended below the bottom side of the housing 1, the mini memory card connector can easily and rapidly be bonded to a printed circuit board by means of SMT (surface mounting technique).

The first terminal set 2 includes, for example, 20 pieces of terminals 21 that are respectively inserted into the front terminal grooves 131 in the bottom wall 13 from the front side. The pin signals of the first terminal set 2 correspond to an XD card. When an XD card inserted into the insertion slot 12, the contacts of the XD card are respectively forced into contact with the contact ends 22 of the terminals 21, enabling the read write apparatus to read/write the XD card.

The second terminal set 3 includes, for example, 9 pieces of terminals 31 that are put in the opening 133 and inserted into the middle terminal grooves 132. When installed, the pin signals of the second terminal set 3 correspond to a SD card or MMC card. When a SD card or MMC card inserted into the insertion slot 12, the contacts of the SD card or MMC card are respectively forced into contact with the contact ends 32 of the terminals 31, enabling the read write apparatus to read/write the SD card or MMC card.

The third terminal set 4 includes, for example, 10 pieces of terminals 41 that are inserted into the terminal slots 151 in the vertical back wall 15 from the rear side of the housing 1, keeping the respective contacts 42 suspended in the opening 133. When installed, the pin signals of the third terminal set 4 correspond to a MS card. When a MS card inserted into the insertion slot 12, the contacts of the MS card are respectively forced into contact with the contact ends 42 of the terminals 41, enabling the read write apparatus to read/write the MS card.

In order to let the housing 1 be positively be bonded to a printed circuit board, each vertical lateral sidewall 14 is made having at least one mounting hole 141, which receives a respective mounting plate 142 that has a plurality of bottom mounting legs 142*a* for fastening to the printed circuit board by soldering or screws.

Further, in order to enhance the EMI protective power, a metal shield 5 is covered over the top side of the housing 1. The two vertical lateral sidewalls 14 of the housing 1 each have at least one pair of retaining blocks 143 protruding from the respective outer side. The metal shield 5 has retaining holes 52 in each of the two opposite side flanges 51. When the metal shield 5 covered on the housing 1, the retaining holes 52 are respectively forced into engagement with the retaining blocks 143. Further, the side flanges 51 each have an inwardly protruded locating strip 53 that is inserted through a through hole 144 above one mounting hole 141 and connected to one mounting plate 142, forming a grounding loop that protects the mini memory card connector against static electricity.

Figure 1:
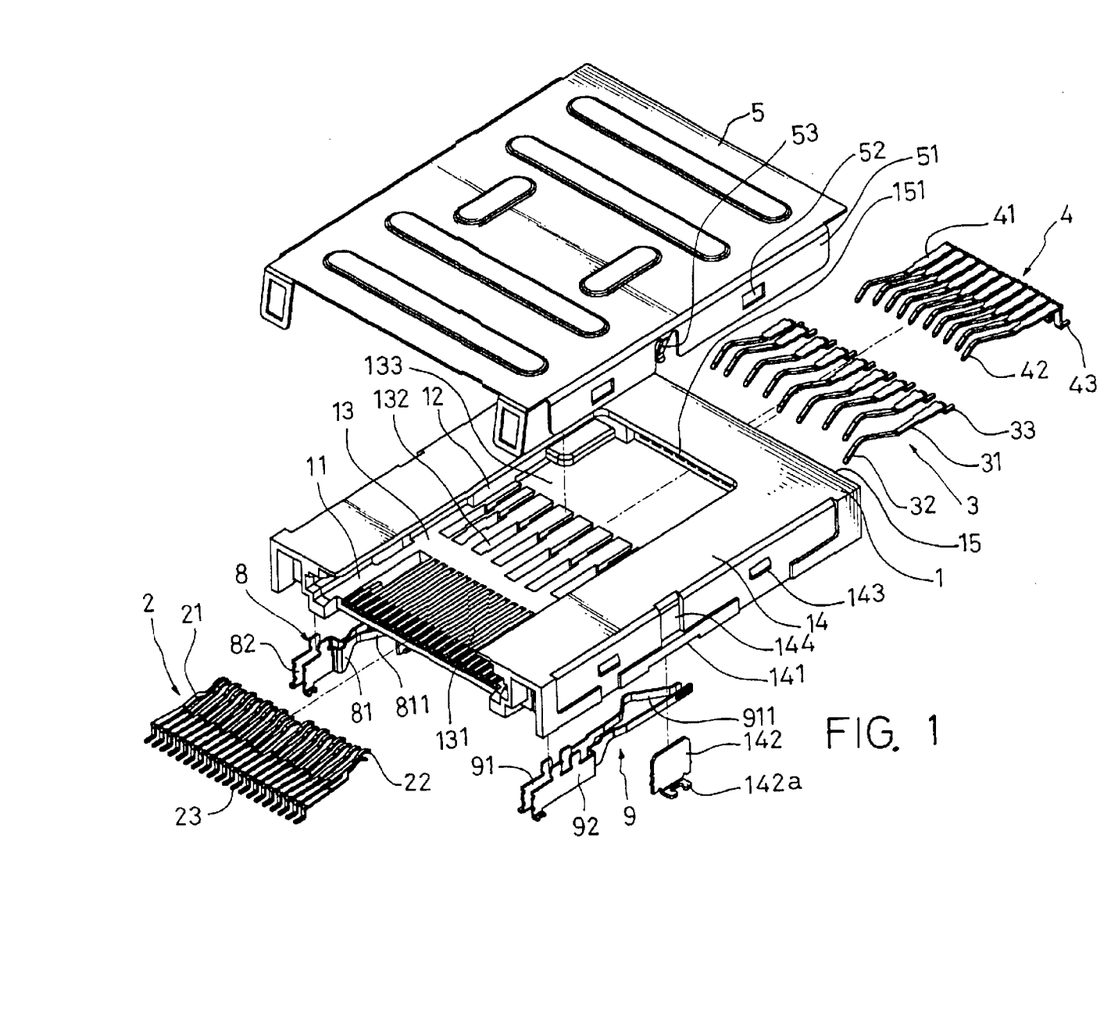
FIG. 1 is an exploded front view of a mini memory card connector according to the present invention.
Figure 2:
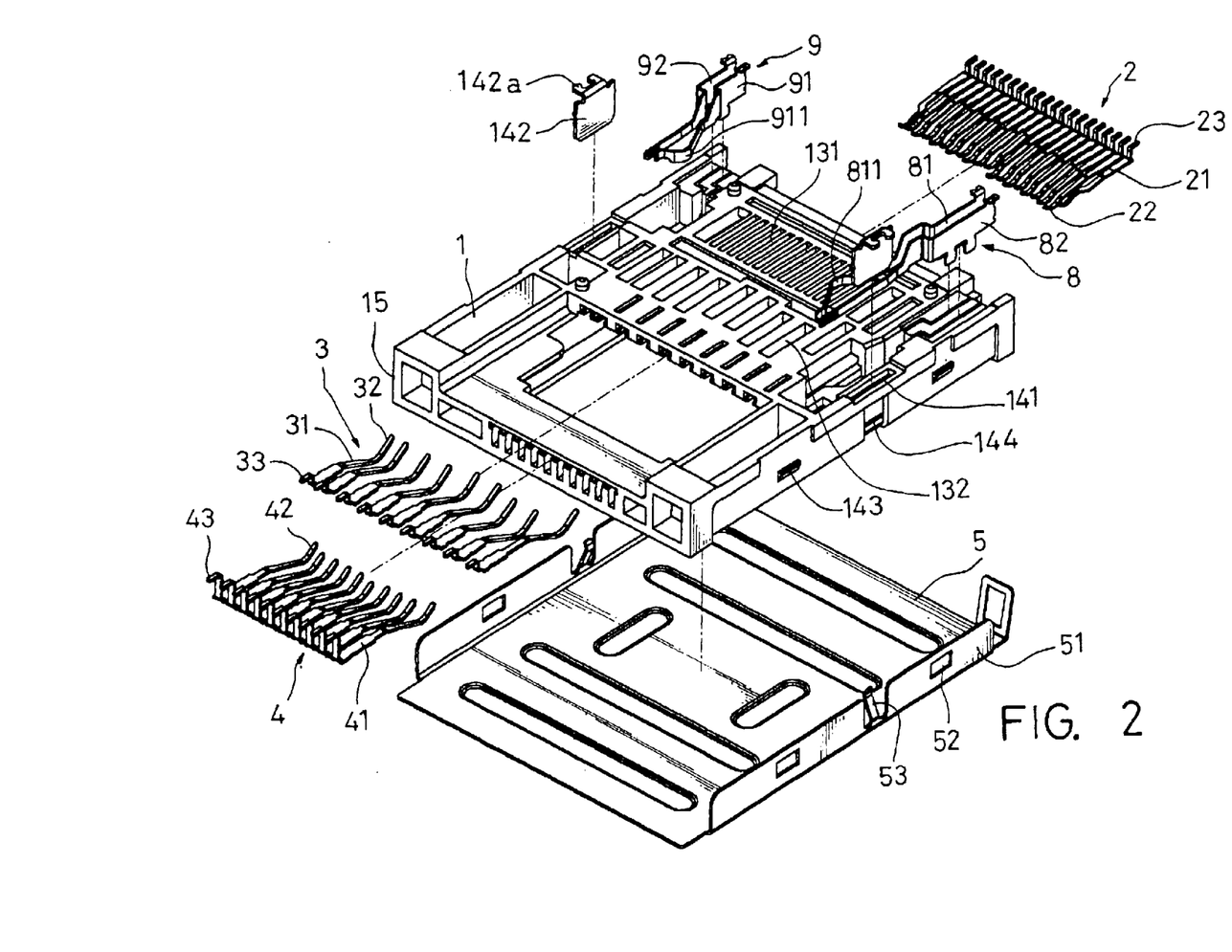
FIG. 2 is an exploded back side view of the mini memory card connector according to the present invention.
Figure 3:
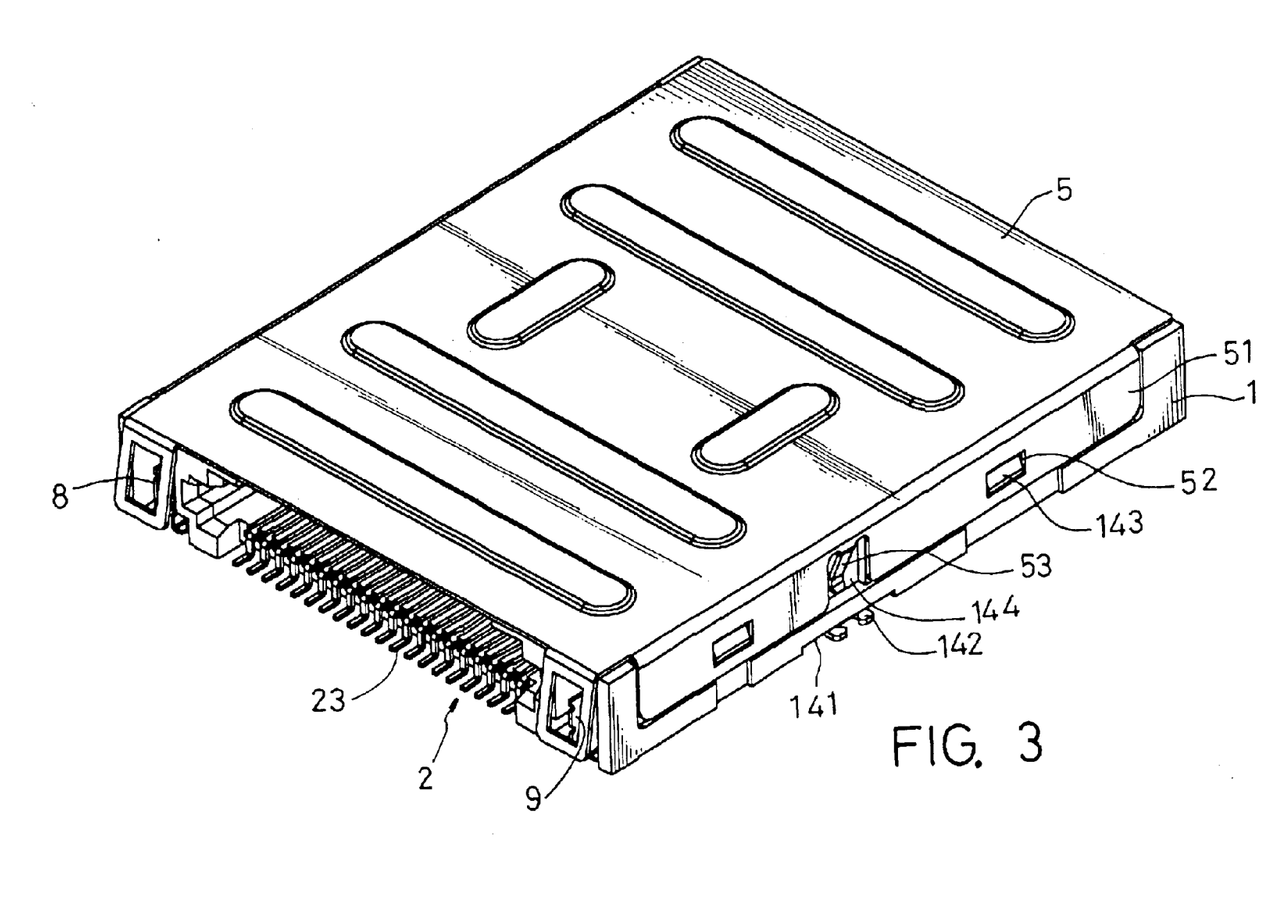
FIG. 3 is an elevational assembly view of the mini memory card connector according to the present invention.
Figure 4:
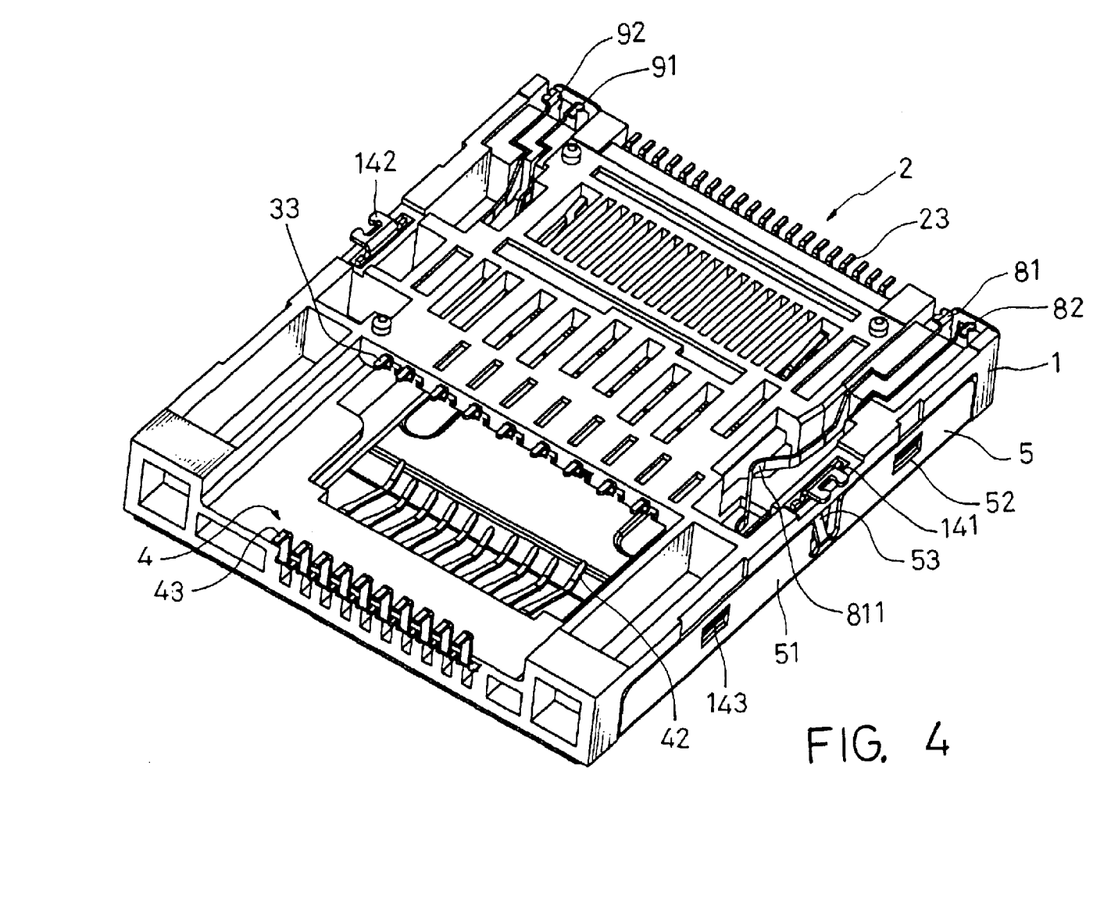
FIG. 4 is a perspective back side view of the mini memory card connector according to the present invention.
Figure 5:
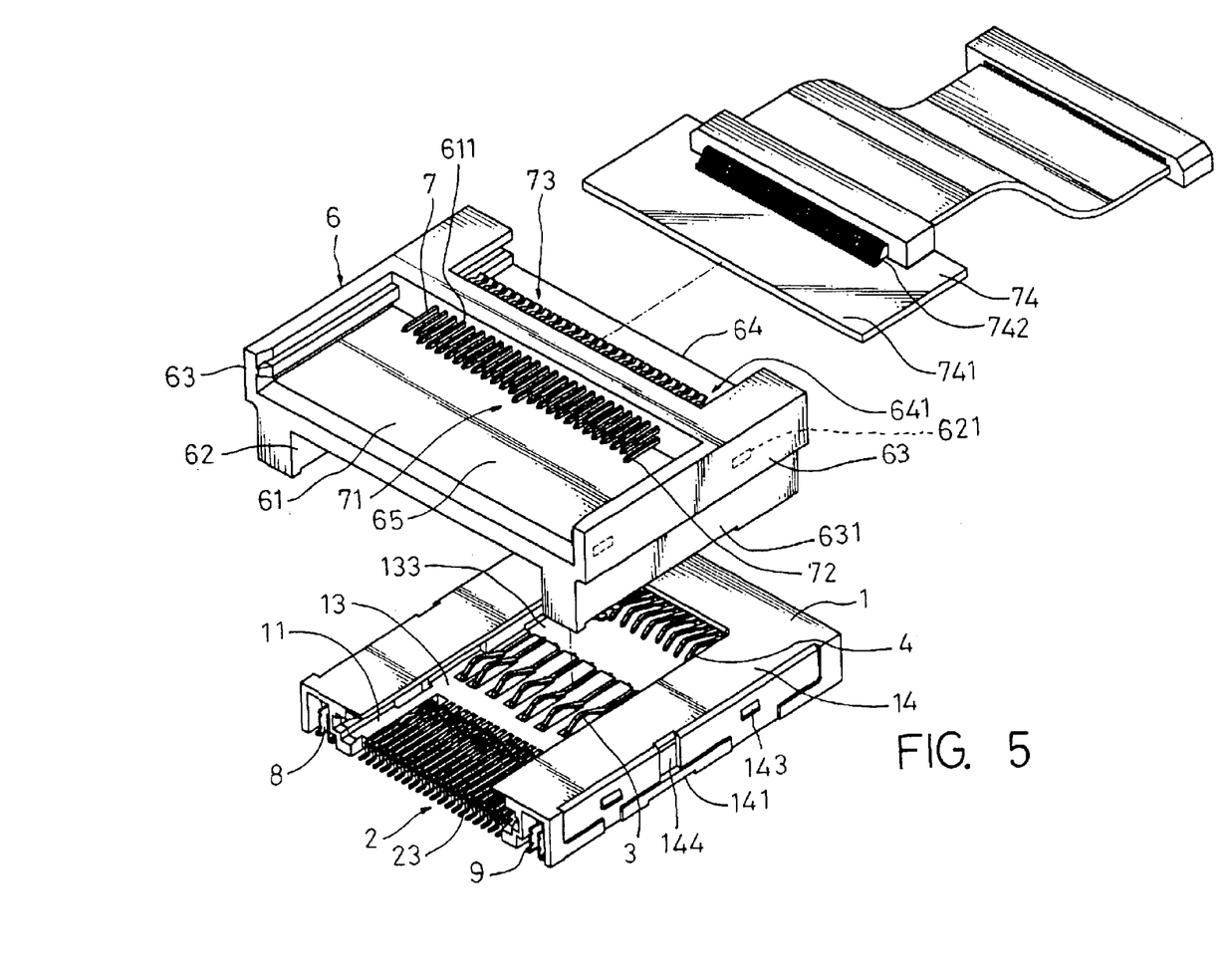
FIG. 5 is an exploded view showing the relationship between the mini memory card connector and a deck and adapter circuit board according to the present invention.
Figure 6:
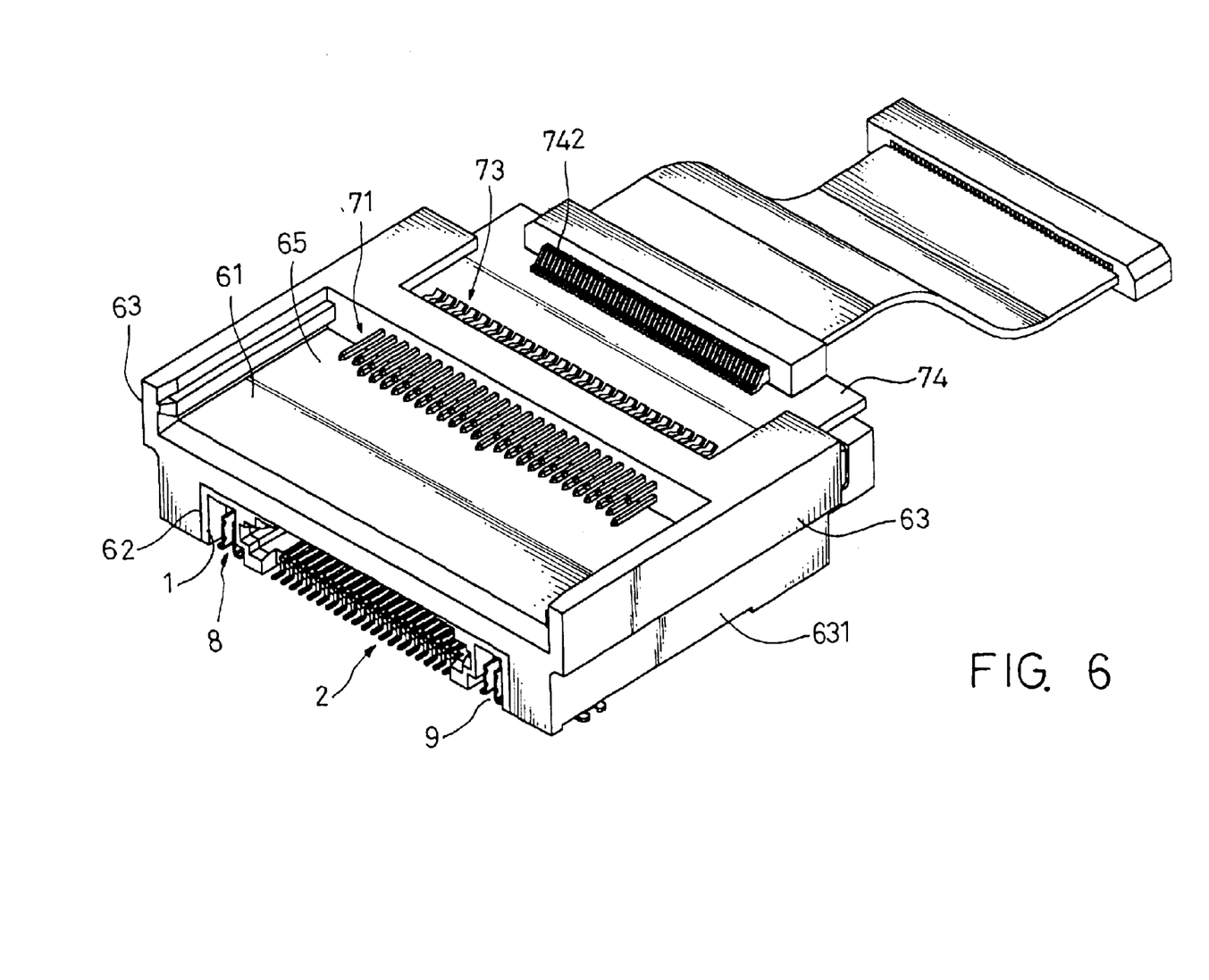
FIG. 6 is an elevational assembly view of FIG. 5.
Figure 7:
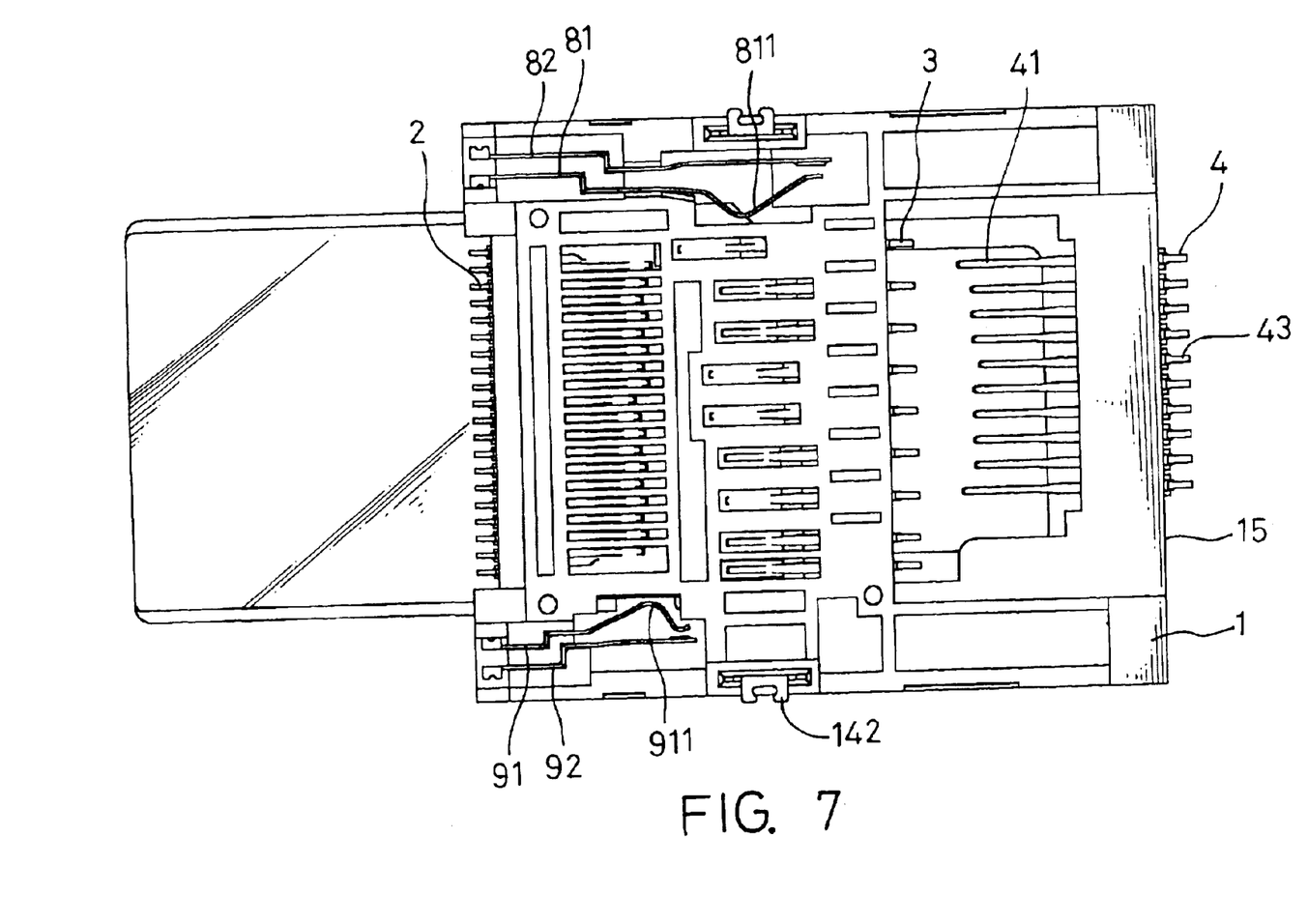
FIG. 7 is a schematic top view of the present invention before the installation of the sensor and the write protection device in the mini memory card connector.
Figure 8:
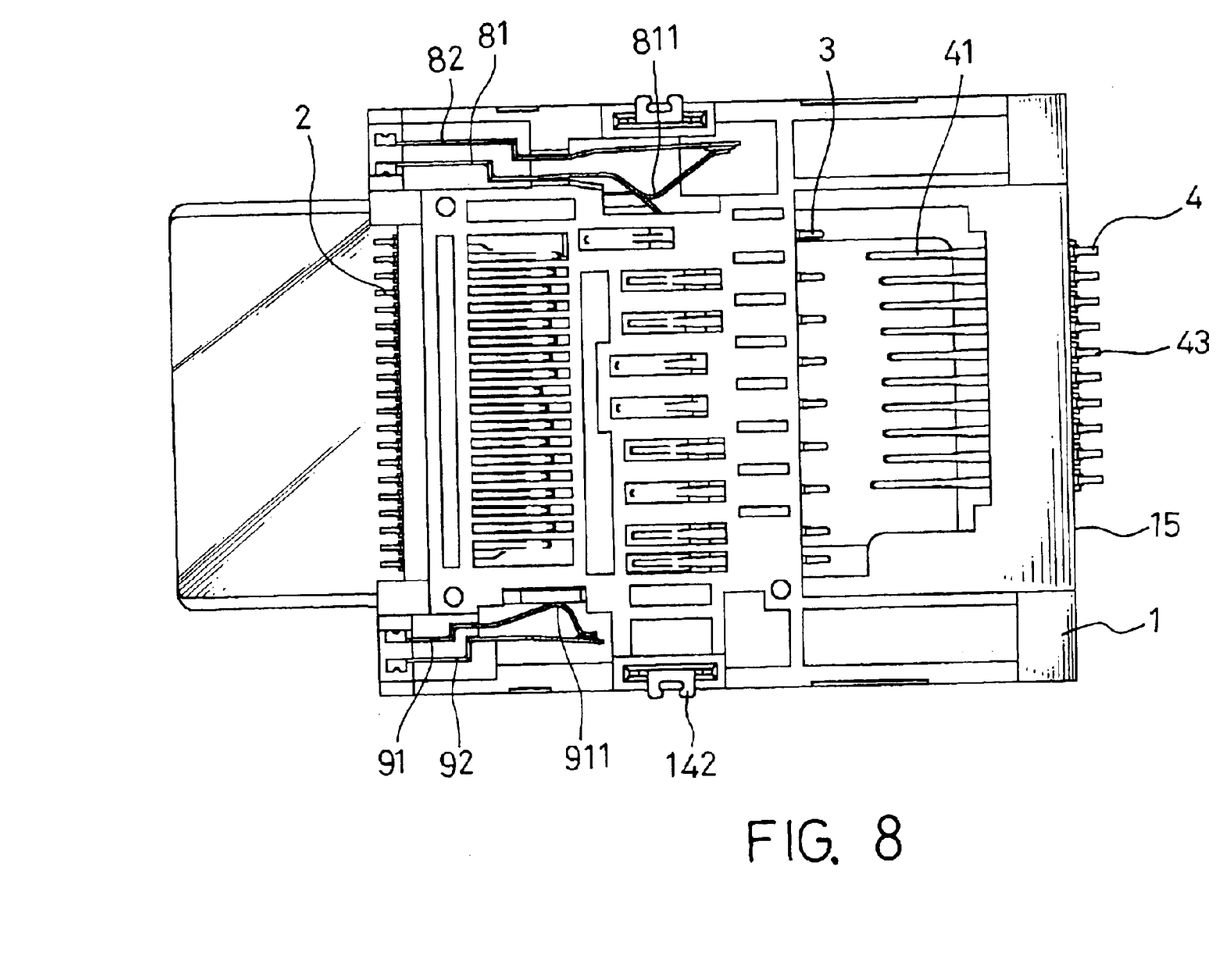
FIG. 8 is similar to FIG. 7 but showing the sensor and the write protection device installed in the mini memory card connector.

FIGS. 5 and 6 show the installation of a deck 6 in the housing 1. The deck 6 has a horizontal partition wall 61, two vertical bottom sidewalls 62 arranged in parallel at the bottom side of the horizontal partition wall 61, a vertical bottom back wall 64 connected between the vertical bottom sidewalls 62 and defining with the vertical bottom sidewalls 62 and the vertical bottom back wall 64 an auxiliary insertion slot 64. The vertical bottom sidewalls 62 each have a plurality of retaining holes 621 adapted to receive the retaining blocks 143 of the housing 1. The vertical bottom back wall 64 has terminal slots 641 adapted to receive terminals 71 of a fourth terminal set 7, for enabling the contact ends 72 of the terminals 71 to be respectively positioned in respective terminal grooves 611 in the horizontal partition wall 61 and the solder ends 73 of the terminals 71 to be connected to the printed circuit board of the read write apparatus through electric connecting means, for example, a bus line or flex circuit board. Alternatively, the solder ends 73 of the terminals 71 can be disposed in contact with or soldered to contacts 741 of an adapter circuit board 74, which has a signal connector 742 for connection to the printed circuit board of the read write apparatus through a bus line or flex circuit board. The deck B has at least one pair of retaining blocks 631 adapted to engage the retaining holes 52 of the shield 5. The fourth terminal set 7 is compatible to CF card as well as SM card. Referring to FIGS. 7 and 8 and FIGS. 1–4 again, in order to provide detection and write protection functions, a sensor 8 and a write protection device 9 are respectively installed in the two opposite vertical lateral sidewalls 14. As illustrated in FIG. 8, when a SD card inserted into the mini memory card connector, one sidewall of the SD card touches the arched detection portion 811 of the probe 81 of the sensor 8, thereby causing the detection portion 811 to deform and to contact a recognition terminal 82 of the sensor 8, and therefore a signal is produced, indicating the insertion of a SD card into the housing 1. If the write protection switch of the SD card has been switched to the write protection position before insertion of the SD card into the housing 1, one sidewall of the SD card will touch the arched detection portion 911 of the write protection terminal 91 of the write protection device 9, thereby causing the detection portion 911 to deform and to contact a recognition terminal 92 of the write protection device 9, and therefore a signal is produced, indicating the write protection status of the SD card.

As indicated above, the housing needs only one insertion slot to receive one of a set of different mini memory cards such as XD card, MS card, SD card, and MMC card. Further, a metal shield is provided to protect prevent leakage of electromagnetic waves and to connect static electricity to the ground. The arrangement of the sensor and the write protection device detects the insertion of a SD card and its write protection status. A deck may be attached to the housing of the mini memory card connector, enabling the mini memory card connector to receive a big memory card, for example, a CD card or SM card.

A prototype of mini memory card connector has been constructed with the features of FIGS. 1–8. The mini memory card connector functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A mini memory card connector comprising a housing made from electrically insulating material, said housing comprising a horizontal bottom wall, two lateral sidewalls, a vertical back wall, an insertion slot defined by said horizontal bottom wall, said lateral sidewalls and said vertical back wall and adapted to receive a mini memory card, a plurality of front terminal grooves formed in said horizontal bottom wall at a front side, a plurality of middle terminal grooves formed in said horizontal bottom wall at a rear side, a plurality of rear terminal slots formed in said vertical back wall, a set of first terminals respectively mounted in said front terminal grooves for the contact of a first mini memory card, a set of second terminals respectively in said middle terminal grooves for the contact of a second mini memory card, and a set of third terminals respectively mounted in said rear terminal slots for the contact of a third mini memory card, said first terminals and said second terminals and said third terminals each having a solder end respectively extended out of a bottom side of said housing for mounting.

2. The mini memory card connector as claimed in claim 1, wherein said first terminals, said second terminals, and said third terminals are respectively provided for the contact of a XD card, a SD/MMC card, and a MS card.

3. The mini memory card connector as claimed in claim 1, wherein the number of said first terminals is 20 that is compatible to a XD card; the number of said second terminals is 9 that is compatible to a SD/MMC card; the number of said third terminals is 10 that is compatible to a MS card.

4. The mini memory card connector as claimed in claim 1, wherein the solder ends of said first, second and third terminals are adapted to be bonded to a printed circuit board by surface mounting technique.

5. The mini memory card connector as claimed in claim 1, wherein said housing has an opening defined between said lateral sidewalls in front of said vertical back wall.

6. The mini memory card connector as claimed in claim 1, wherein said housing has a top side covered with a metal shield and at least one pair of retaining blocks respectively projecting from said two opposite lateral sidewalls at an outer side, said metal shield comprising at least one pair of retaining holes disposed in two opposite downwardly extended side flanges there of and respectively forced into engagement with the retaining blocks of said housing.

7. The mini memory card connector as claimed in claim 1, wherein the two opposite lateral sidewalls of said housing each have at least one mounting hole in a bottom side and at least one mounting plate respectively mounted in said at least one mounting hole for bonding to a printed circuit board.

8. The mini memory card connector as claimed in claim 7, wherein the side flanges of said metal shield each have an inwardly protruded locating strip respectively inserted through a respective through hole in the opposite lateral sidewalls of said housing and connected to said at least one mounting plate for grounding.

9. The mini memory connector as claimed in claim 1, further comprising a sensor installed in one lateral sidewall of said housing, said sensor having a detection terminal projecting into said insertion slot and adapted to detect the insertion of a SD card in said insertion slot.

10. The mini memory card connector as claimed in claim 9, further comprising a write protection device installed in one lateral sidewall of said housing opposite to said sensor, said write protection device having a write protection terminal projecting into said insertion slot and adapted to determine the write protection status of a SD card being inserted into said insertion slot.

11. The mini memory card connector as claimed in claim 1, further comprising a deck coupled to said housing, said deck comprising a horizontal partition wall, two vertical bottom sidewalls arranged in parallel at a bottom side of said horizontal partition wall, a vertical bottom back wall connected between said vertical bottom sidewalls and defining with said vertical bottom sidewalls and said vertical bottom back wall an auxiliary insertion slot for receiving one of a set of big memory cards, said vertical bottom sidewalls each have plurality of retaining holes adapted to receive the retaining blocks of said housing, said vertical bottom back wall having a plurality of terminal slots and a plurality of fourth terminals respectively mounted in the terminal slots for the contact of respective contacts of a big memory card being inserted into said auxiliary insertion slot, said fourth terminals each having a solder end respectively extended out of said deck for connecting to a printed circuit board through an electric connecting device.

12. The mini memory card connector as claimed in claim 11, wherein big memory cards include CF card and SM card.

13. The mini memory card connector as claimed in claim 11, wherein said electric connecting device is selected from a set of connecting devices including bus line and flex circuit board.

14. The mini memory card connector as claimed in claim 11, wherein said vertical bottom sidewalls of said deck each have at least one retaining hole, and said housing has at least one retaining block respectively projecting from each of the two opposite lateral sidewalls thereof and adapted to engage the at least one retaining hole of said deck.

15. The mini memory card connector as claimed in claim 11, wherein the solder ends of said fourth terminals are respectively connected to respective contacts of an adapter circuit board.

16. The mini memory card connector as claimed in claim 15, wherein said adapter circuit board has a signal connector for connection to the printed circuit board of a read write apparatus through an electric connecting means.

17. The mini memory connector as claimed in claim 16, wherein the electric connecting means for connecting said signal connector to said printed circuit board is selected from a set of connecting means including a bus line and a flex circuit board.

* * * * *